US012281511B2

(12) United States Patent
Ramesh et al.

(10) Patent No.: US 12,281,511 B2
(45) Date of Patent: Apr. 22, 2025

(54) ADJUSTABLE CURSOR FOR GLASS IN A VEHICLE

(71) Applicant: INTEVA PRODUCTS, LLC, Troy, MI (US)

(72) Inventors: Santosh Ramesh, Karnataka (IN); Karl-Heinz Kreher, Mühlheim (DE)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 18/117,039

(22) Filed: Mar. 3, 2023

(65) Prior Publication Data

US 2023/0279712 A1 Sep. 7, 2023

(30) Foreign Application Priority Data

Mar. 4, 2022 (IN) ............................ 202211011729

(51) Int. Cl.

*E05F 11/48* (2006.01)
*E05F 11/40* (2006.01)
*E05F 15/697* (2015.01)

(52) U.S. Cl.

CPC .......... *E05F 11/483* (2013.01); *E05F 11/405* (2013.01); *E05F 15/697* (2015.01); *E05Y 2900/55* (2013.01)

(58) Field of Classification Search

CPC ..... E05F 11/483; E05F 11/405; E05F 11/382; E05F 15/697; E05Y 2201/654; E05Y 2201/658; E05Y 2600/12; E05Y 2600/20
USPC .......................................... 49/352, 374, 375
See application file for complete search history.

(56) References Cited

U.S. PATENT DOCUMENTS

| | | | | |
|---|---|---|---|---|
| 7,801,347 | B2 * | 9/2010 | Hampel et al. | |
| 10,273,733 | B2 * | 4/2019 | Huang | B60J 1/17 |
| 11,162,291 | B2 * | 11/2021 | Reames | E05F 11/488 |
| 11,168,501 | B2 * | 11/2021 | Pavlovic | E05F 11/382 |
| 11,499,361 | B2 * | 11/2022 | Magazzini | E05F 11/488 |
| 2009/0007494 | A1 * | 1/2009 | Pavlovic | E05F 11/488 49/348 |
| 2010/0043297 | A1 * | 2/2010 | Barr | E05F 11/385 24/458 |
| 2010/0325962 | A1 * | 12/2010 | Hampel | E05F 11/382 49/157 |

(Continued)

FOREIGN PATENT DOCUMENTS

| | | | | |
|---|---|---|---|---|
| CN | 116575831 A * | 8/2023 | | B60J 5/0416 |
| EP | 1400650 A2 * | 3/2004 | | E05F 11/382 |

OTHER PUBLICATIONS

English Translation of CN Notification to Make Rectification, Mailed Sep. 18, 2023, IPL1434CN2.

(Continued)

*Primary Examiner* — Jerry E Redman
(74) *Attorney, Agent, or Firm* — CANTOR COLBURN LLP

(57) ABSTRACT

A cursor assembly for a window regulator of a vehicle door, including: a main body portion; a clamping member secured to the main body portion; a cable securement feature that is moveably secured to the main body portion by an adjustment screw, wherein rotation of the adjustment screw about an axis will cause the cable securement feature to move along the axis with respect to the main body portion; and a gear train operably coupled to the adjustment screw.

15 Claims, 6 Drawing Sheets

(56) References Cited

U.S. PATENT DOCUMENTS

| | | | | |
|---|---|---|---|---|
| 2011/0067311 | A1* | 3/2011 | Corden | E05F 11/382<br>184/14 |
| 2018/0326820 | A1* | 11/2018 | Huang | E05F 11/385 |
| 2020/0173212 | A1* | 6/2020 | Pavlovic | E05F 11/385 |
| 2020/0386026 | A1* | 12/2020 | Reames | E05F 11/385 |

OTHER PUBLICATIONS

Notification to Make Rectification, Mailed Sep. 18, 2023, IPL1434CN2.

* cited by examiner

ADJUSTABLE CURSOR FOR GLASS IN A VEHICLE

CROSS REFERENCE TO RELATED APPLICATIONS

This application claims priority under 35 U.S.C. § 119 to the following Indian Patent Application No. 202211011729, filed on Mar. 4, 2022, the entire contents of which are incorporated herein by reference thereto

BACKGROUND

Exemplary embodiments of the present disclosure pertain to the art of vehicle windows and in particular window systems.

Window systems are adjusted for glass sealing by adjusting the regulator rails by means of slotted brackets or Jack screws.

However, this method can limit the stiffness of the system, is costly in tools and components, and can adversely affect the glass system deflection. In addition and when the adjustment is performed on the rail, additional clearances are needed in the door for rail packaging.

BRIEF DESCRIPTION

Disclosed is a cursor assembly for a window regulator of a vehicle door, including: a main body portion; a clamping member secured to the main body portion; a cable securement feature that is moveably secured to the main body portion by an adjustment screw, wherein rotation of the adjustment screw about an axis will cause the cable securement feature to move along the axis with respect to the main body portion; and a gear train operably coupled to the adjustment screw.

In addition to one or more of the features described above, or as an alternative to any of the foregoing embodiments, the adjustment screw is threadingly received in a nut or boss at one end and a gear is attached to the adjustment screw at an opposite end.

In addition to one or more of the features described above, or as an alternative to any of the foregoing embodiments, the gear train includes a drive member with a spur gear that is operably coupled to a gear of the adjustment screw via an idler gear.

In addition to one or more of the features described above, or as an alternative to any of the foregoing embodiments, the gear train is received within a housing that is secured to the main body portion.

In addition to one or more of the features described above, or as an alternative to any of the foregoing embodiments, the gear train includes a drive member with a spur gear that is operably coupled to a gear of the adjustment screw via an idler gear.

In addition to one or more of the features described above, or as an alternative to any of the foregoing embodiments, the drive member extends from the housing and the drive member has a feature that is configured to be engaged by a tool.

In addition to one or more of the features described above, or as an alternative to any of the foregoing embodiments, the feature is configured to be engaged by a socket portion of the tool.

In addition to one or more of the features described above, or as an alternative to any of the foregoing embodiments, the feature is a socket portion that is engaged by a complimentary nut portion of the tool.

In addition to one or more of the features described above, or as an alternative to any of the foregoing embodiments, the adjustment screw is threadingly received in a nut or boss at one end and the gear is attached to the adjustment screw at an opposite end.

In addition to one or more of the features described above, or as an alternative to any of the foregoing embodiments, the cursor assembly is a pivoting cursor assembly.

In addition to one or more of the features described above, or as an alternative to any of the foregoing embodiments, the cursor assembly is a pivoting cursor assembly.

Also disclosed is a window regulator, including: a pair of guide rails; a pair of cursor assemblies, one of the pair of cursor assemblies being secured to one of the pair of guide rails and the other one of the pair of cursor assemblies being secured to the other one of the pair of guide rails, each one of the pair of cursor assemblies including: a main body portion; a clamping member secured to the main body portion; a cable securement feature that is moveably secured to the main body portion by an adjustment screw, wherein rotation of the adjustment screw about an axis will cause the cable securement feature to move along the axis with respect to the main body portion; and a gear train operably coupled to the adjustment screw.

In addition to one or more of the features described above, or as an alternative to any of the foregoing embodiments, the adjustment screw is threadingly received in a nut or boss at one end and a gear is attached to the adjustment screw at an opposite end.

In addition to one or more of the features described above, or as an alternative to any of the foregoing embodiments, the gear train includes a drive member with a spur gear that is operably coupled to a gear of the adjustment screw via an idler gear.

In addition to one or more of the features described above, or as an alternative to any of the foregoing embodiments, the gear train is received within a housing that is secured to the main body portion.

In addition to one or more of the features described above, or as an alternative to any of the foregoing embodiments, the gear train includes a drive member with a spur gear that is operably coupled to a gear of the adjustment screw via an idler gear.

In addition to one or more of the features described above, or as an alternative to any of the foregoing embodiments, the drive member extends from the housing and the drive member has a feature that is configured to be engaged by a tool.

In addition to one or more of the features described above, or as an alternative to any of the foregoing embodiments, the pair of cursor assemblies are a pair of pivoting cursor assemblies.

Also disclosed is a method of adjusting a cursor assembly with respect to a guide rail of a window regulator, including: rotating an adjustment screw of the cursor assembly about an axis, wherein rotation of the adjustment screw about the axis will cause a cable securement feature to move along the axis with respect to a main body portion of the cursor assembly, the adjustment screw being operably coupled to a gear train.

In addition to one or more of the features described above, or as an alternative to any of the foregoing embodiments, the cursor assembly is a pivoting cursor assembly.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
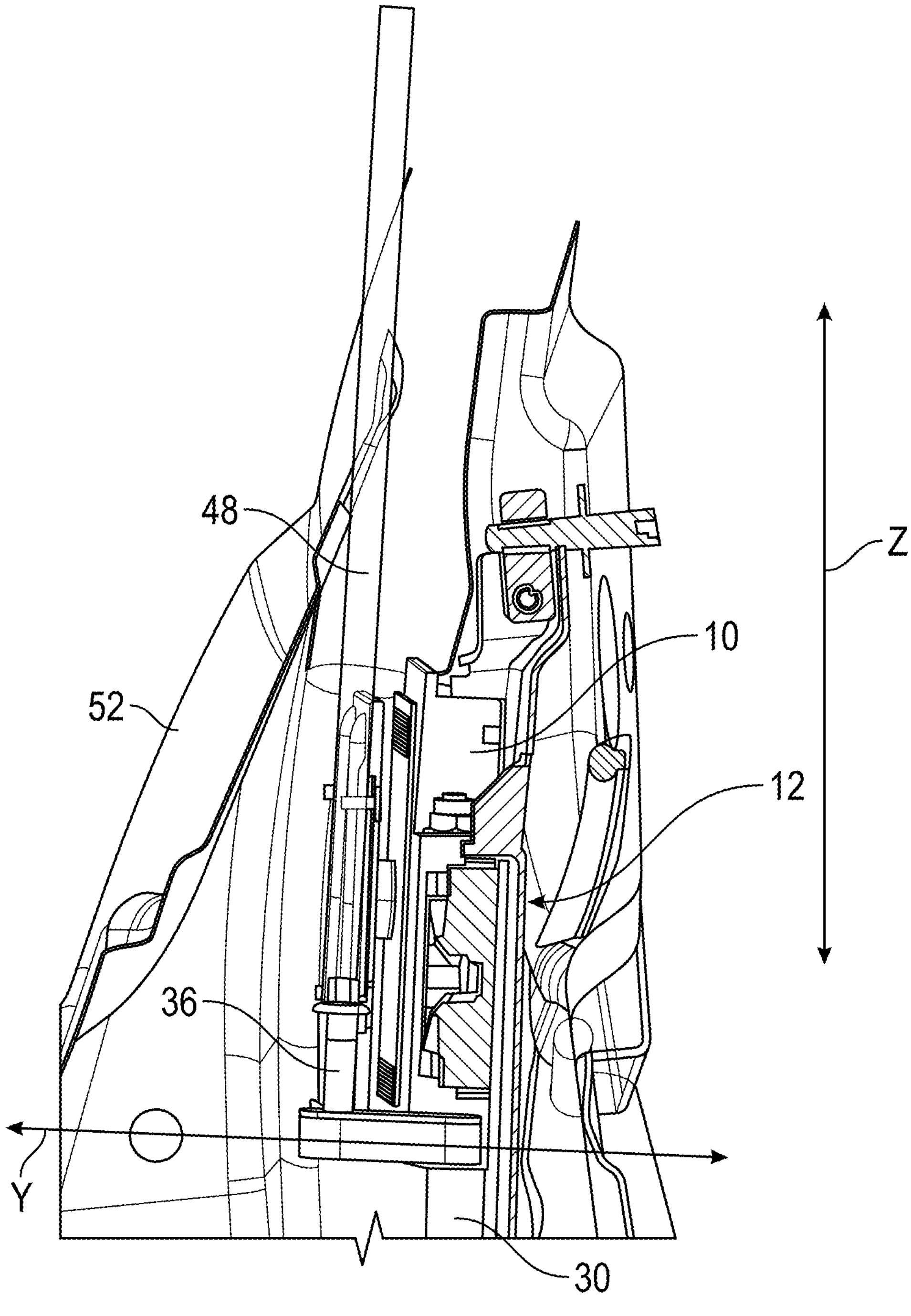
FIG. 1 is a partial cross-sectional view of a vehicle door and window with an adjustable cursor assembly in accordance with the present disclosure.
Figure 2:
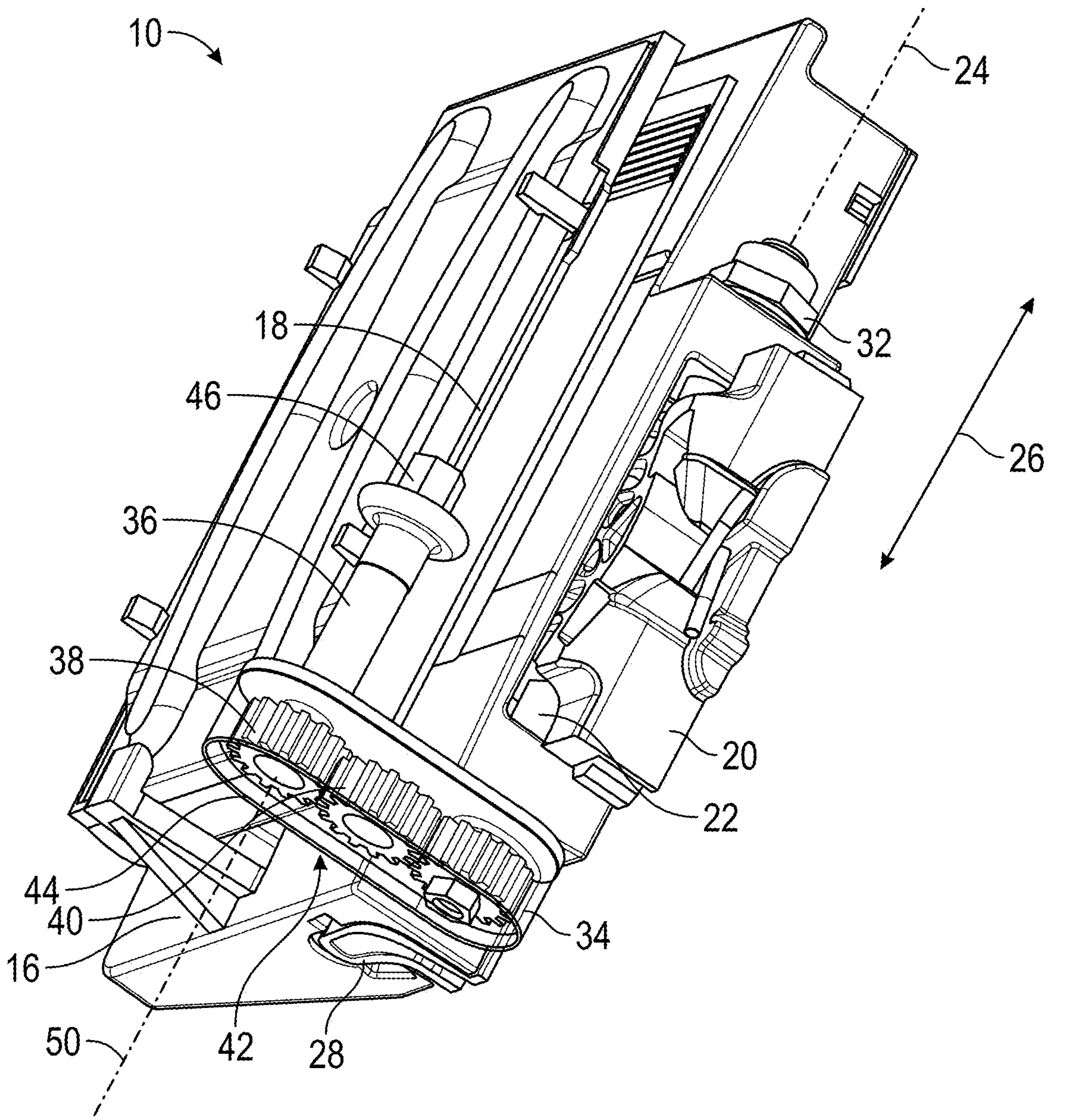
FIG. 2 is a perspective view an adjustable cursor assembly in accordance with the present disclosure.
Figure 3:
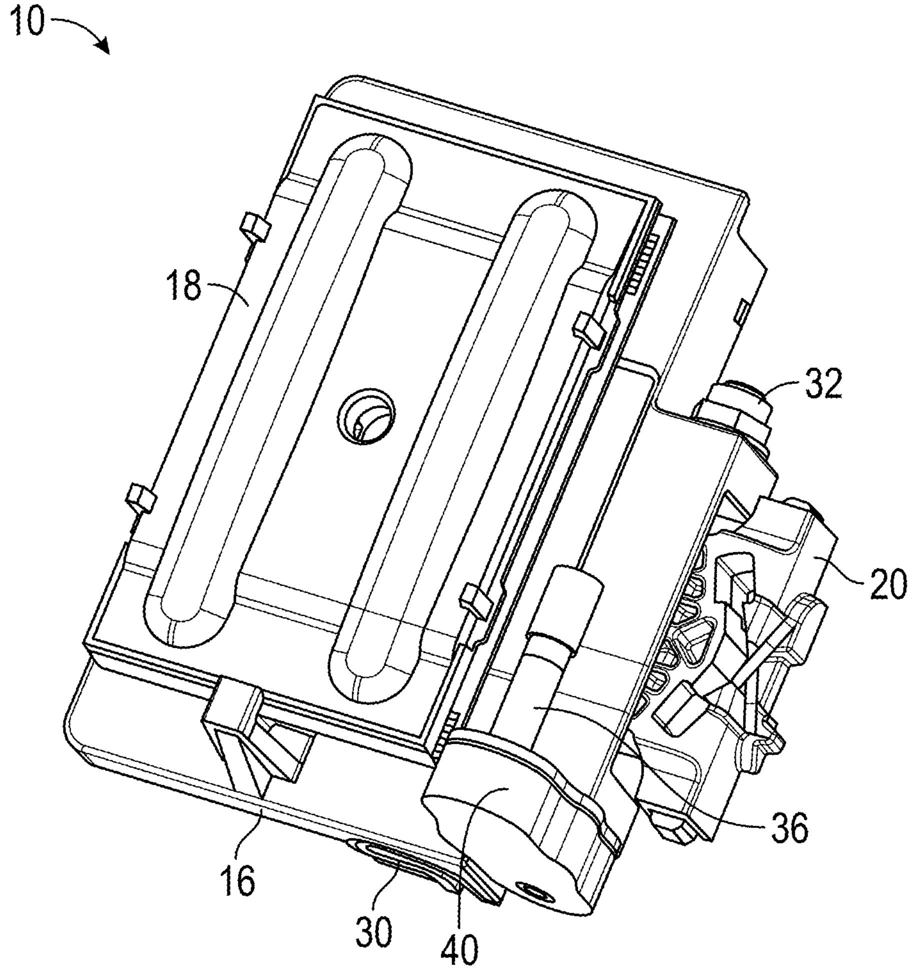
FIG. 3 is a perspective view an adjustable cursor assembly in accordance with the present disclosure.
Figure 4:
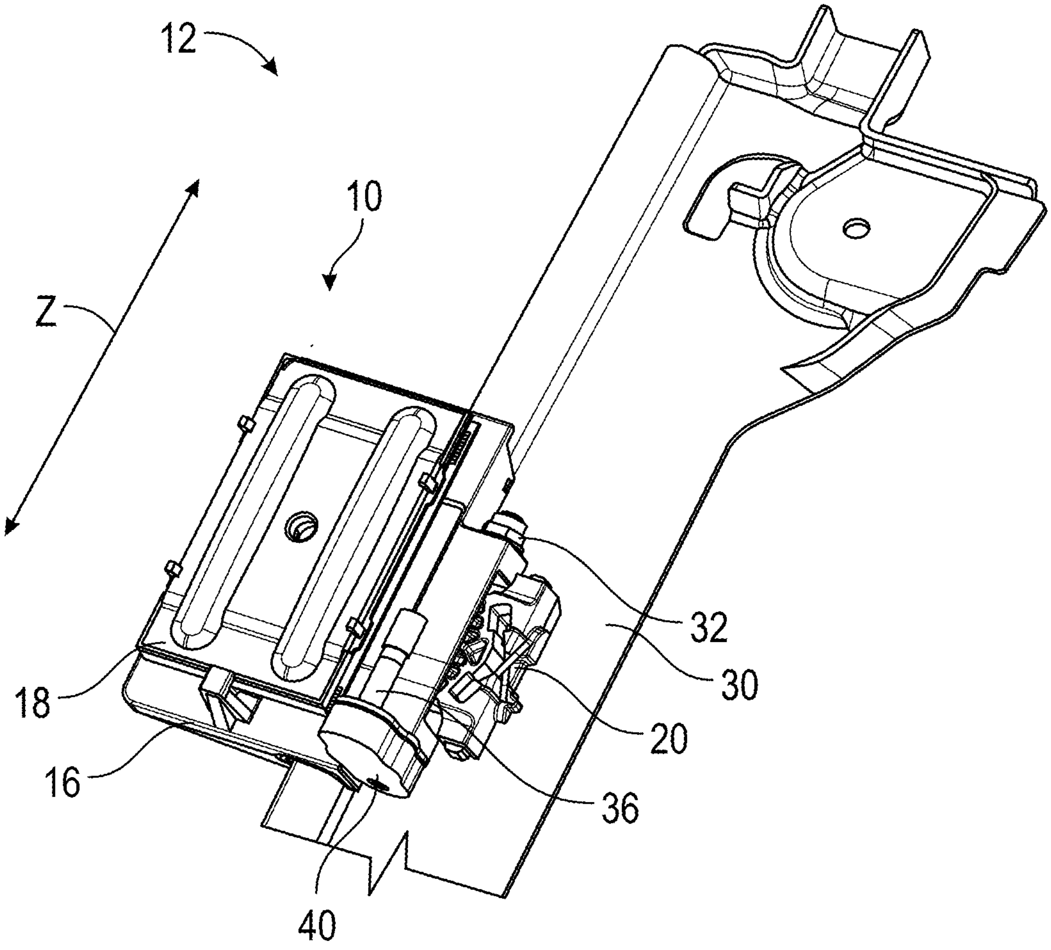
FIG. 4 is a perspective view of a portion of a guide rail with an adjustable cursor assembly in accordance with the present disclosure.

A detailed description of one or more embodiments of the disclosed apparatus and method are presented herein by way of exemplification and not limitation with reference to the Figures.

The present disclosure is directed to a cursor assembly for use with a window regulator with at least the following main elements: a cursor body with a moveable cable securement feature that is configured to slide along a rail of the window regulator; and a clamping plate that is configured to be secured to a window of a vehicle the window regulator is secured to.

In addition, the cursor assembly is contemplated for use in a frameless door assembly for an automotive vehicle the window has no frame surrounding its top and upper side portions of its sides when the window is in the closed position. As such, a window regulator for a frameless door assembly must provide window stability in all directions and effectuate movement of the window to and from its associated exterior seal on the vehicle as the window approaches and leaves its closed position.

Referring now to the FIGS. and in particular FIGS. 1-5, a cursor assembly 10 for use with a window regulator 12 of a vehicle door module is illustrated. The cursor assembly 10 includes a main body portion 16 and a clamping member 18 secured to the main body portion 16. The cursor assembly 10 also includes a cable securement feature or cable adjustment feature 20 that is moveably secured to the main body portion 16 by an adjustment screw 22.

The adjustment screw 22 has a plurality of threads that threadingly engage a threaded opening of the cable securement feature 20. As such and when the adjustment screw 22 is rotated about its axis 24 the cable securement feature 20 is able to move in the directions of arrows 26 with respect to the main body portion 16. When this occurs each cursor assembly 10 of the window regulator 12 is capable of being adjusted up and down in the Z directions such that orientation of a window secured to the cursor assemblies 10 of the window regulator 12 is possible. More particularly and by adjusting the position of the main body portion 16 with respect to the cable securement feature 20 the window orientation is capable of being adjusted. This is due to the fact that cables 28 of the window regulator 12 are secured to the cable securement feature 20 and movement of the cable securement feature 20 with respect to the main body portion 16 will adjust the position of the cursor assemblies 10 slidably received on guide rails 30 of the window regulator 12.

In one embodiment, the adjustment screw 22 is threadingly received in a nut or boss 32 at one end and a gear 34 is attached to the adjustment screw 22 at an opposite end. A drive member 36 with a spur gear 38 is operably coupled to the gear 34 via an idler gear 40. The spur gear 38, idler gear 40 and gear 34 may be referred to as a gear train 42. The gear train 42 is received within a housing 44 that is secured to the main body portion 16. As such, the spur gear 38, idler gear 40 and gear 34 are rotatably received with the housing 44. The spur gear 38 is secured to the drive member 36 while the idler gear 40 is rotatably secured a surface within the housing 44 and the gear 34 is attached to the adjustment screw 22. As such, rotation of the drive member 36 is transferred to the spur gear 38, the idler gear 40, the gear 34 and the adjustment screw 22 such that rotation of the drive member 36 will rotate the adjustment screw 22. The housing 40 is shown in phantom in FIG. 2 so that the spur gear 38, the idler gear 40 and the gear 34 are visible.

The drive member 36 extends upwardly from the housing 44 and has a feature 46 that is configured to be engaged by a tool 48. In one non-limiting embodiment, the feature 46 has a nut or hexagon shape configured to be engaged by a socket portion of the tool 48 as the socket portion of the tool 48 is configured to engage the nut. Alternatively, the drive member 36 has a socket portion 37 (FIG. 6B) that is engaged by a complimentary nut portion of the tool 48.

As such and when the drive member 36 is rotated about its axis 50, spur gear 38 is rotated which in turn rotates idler gear 40 and gear 34 is rotated. As gear 34 is rotated adjustment screw 22 secured thereto is also rotated and the cable securement feature or the cable adjustment feature 20 moves in the direction of arrows 26 with respect to body portion 16. The movement of the cable adjustment feature 20 will depend on the direction of rotation of adjustment screw 22.

As illustrated in at least FIG. 1, the drive member 36 is accessible by simply removing the outer belt seal of the vehicle door.

Figure 5:
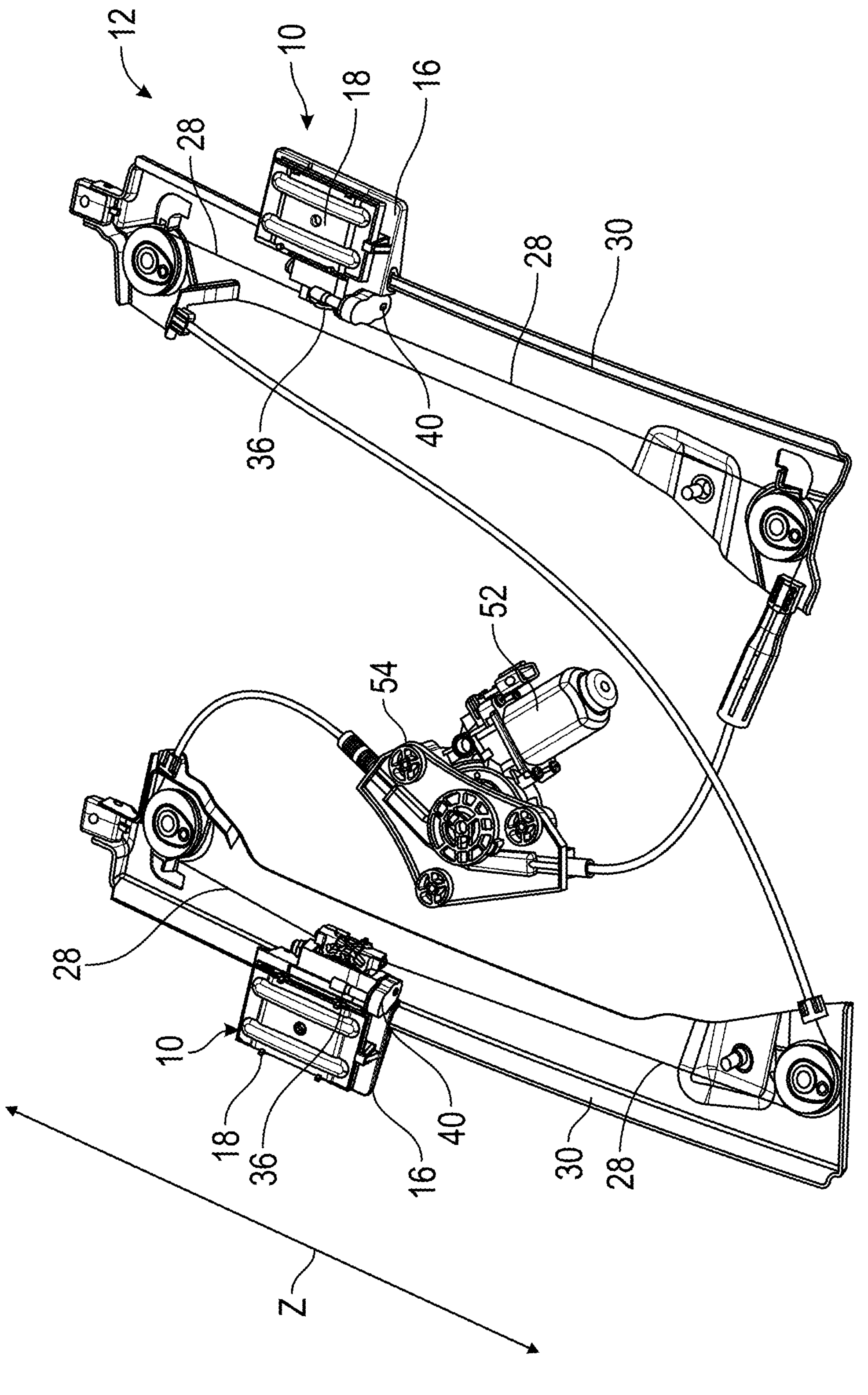
FIG. 5 is a perspective view of a window regulator with adjustable cursor assemblies in accordance with the present disclosure.

FIG. 5 illustrates a dual channel window regulator 12 with cursor assemblies 10 in accordance with one non-limiting embodiment of the present disclosure. Also shown is a motor 52 for driving a cable drum rotatably secured to a housing 54. Cables 28 are secured to the cable drum such that rotation of the cable drum by motor 52 will cause the cursor assemblies 10 to slide along guide rails 30.

Figure 6B:
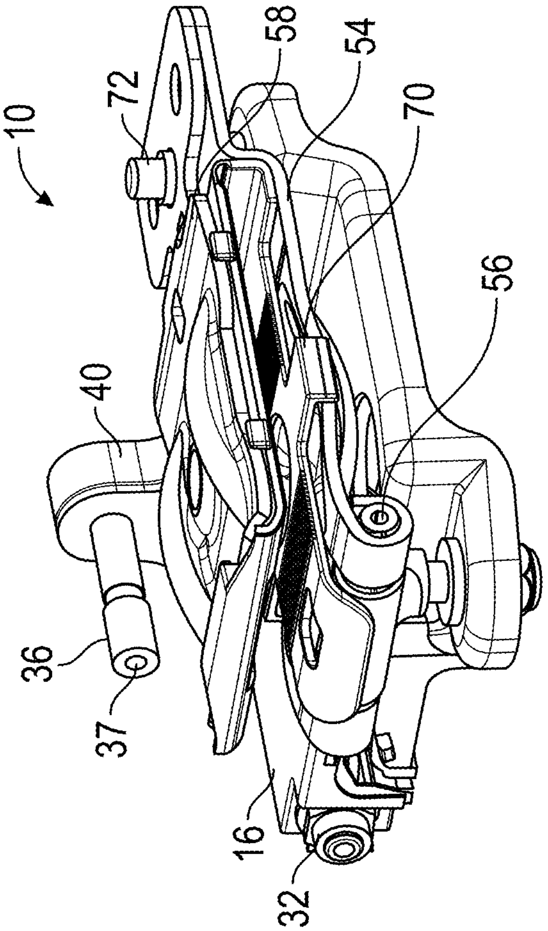
FIGS. 6A-6B are perspective views of an adjustable cursor assembly in accordance with an alternative embodiment of the present disclosure.
Figure 6A:
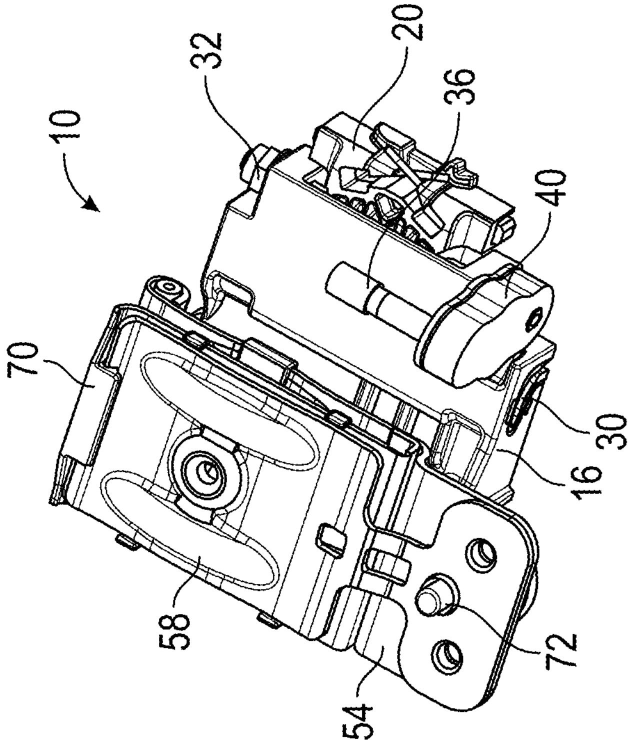

Referring now to FIGS. 6A-6B, an alternative embodiment of the cursor assembly 10 is illustrated. Here the cursor assembly 10 also includes a pivoting feature. As such, the cursor assembly may be referred to as a pivoting cursor assembly 10.

In this embodiment, the clamping member 18 is replaced by a pivoting plate or swing plate 54 that is rotationally or pivotally mounted to main body portion 16 by a pivot pin 56 or a shaft, rod or elongated member 56 that is secured to the main body portion 16. A glass clamp plate 58 is secured to the pivoting plate or swing plate 54 and a seal or isolator 70 is located between a portion of a window received in between the pivoting plate or swing plate 54 and the glass clamp plate 58. In order to secure the window to the pivoting cursor assembly 10, a glass clamp screw threadingly engages a threaded opening in the pivoting plate or swing plate 54. The glass clamp screw has a head portion that is larger than an opening in the glass clamp plate 58 such that the glass clamp screw secures the glass to the pivoting cursor assembly 10 when the glass clamp screw threadingly engages the threaded opening in the pivoting plate or swing plate 54. The glass clamp screw also passes through an opening in the window.

An adjusting screw or threaded adjuster 72 for pivoting the pivoting plate or swing plate 54 with respect to the main body portion 16. The pivoting cursor assembly 10 may further include a locking nut for maintaining the adjusting screw or threaded adjuster 72 in a desired position once the pivoting cursor assembly 10 has been adjusted via rotational movement of the adjusting screw or threaded adjuster 72.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cursor assembly for a window regulator of a vehicle door, comprising:

a main body portion;

a clamping member secured to the main body portion;

a cable securement feature that is moveably secured to the main body portion by an adjustment screw, wherein rotation of the adjustment screw about an axis will cause the cable securement feature to move along the axis with respect to the main body portion; and a gear train operably coupled to the adjustment screw, the gear train having a spur gear, an idler gear and a gear, the gear is secured to the adjustment screw and the idler gear meshing with both the gear and the spur gear and the spur gear is secured to a drive member.

2. The cursor assembly as in claim 1, wherein the adjustment screw is threadingly received in a nut or boss at one end and the gear of the adjustment screw is attached to the adjustment screw at an opposite end.

3. The cursor assembly as in claim 1, wherein the gear train is received within a housing that is secured to the main body portion.

4. The cursor assembly as in claim 3, wherein the drive member extends from the housing and the drive member has a feature that is configured to be engaged by a tool.

5. The cursor assembly as in claim 4, wherein the feature is configured to be engaged by a socket portion of the tool.

6. The cursor assembly as in claim 4, wherein the feature is a socket portion that is engaged by a complimentary nut portion of the tool.

7. The cursor assembly as in claim 4, wherein the cursor assembly is a pivoting cursor assembly.

8. The cursor assembly as in claim 1, wherein the cursor assembly is a pivoting cursor assembly.

9. A window regulator, comprising:

a pair of guide rails;

a pair of cursor assemblies, one of the pair of cursor assemblies being secured to one of the pair of guide rails and the other one of the pair of cursor assemblies being secured to the other one of the pair of guide rails, each one of the pair of cursor assemblies comprising:

a main body portion;

a clamping member secured to the main body portion;

a cable securement feature that is moveably secured to the main body portion by an adjustment screw, wherein rotation of the adjustment screw about an axis will cause the cable securement feature to move along the axis with respect to the main body portion; and a gear train operably coupled to the adjustment screw, the gear train having a spur gear, an idler gear and a gear, the gear is secured to the adjustment screw and the idler gear meshing with both the gear and the spur gear and the spur gear is secured to a drive member.

10. The window regulator as in claim 9, wherein the adjustment screw is threadingly received in a nut or boss at one end and the gear of the adjustment screw is attached to the adjustment screw at an opposite end.

11. The window regulator as in claim 9, wherein the gear train is received within a housing that is secured to the main body portion.

12. The window regulator as in claim 11, wherein the drive member extends from the housing and the drive member has a feature that is configured to be engaged by a tool.

13. The window regulator as in claim 9, wherein the pair of cursor assemblies are a pair of pivoting cursor assemblies.

14. A method of adjusting a cursor assembly with respect to a guide rail of a window regulator, comprising:

rotating an adjustment screw of the cursor assembly about an axis, wherein rotation of the adjustment screw about the axis will cause a cable securement feature to move along the axis with respect to a main body portion of the cursor assembly, the adjustment screw being operably coupled to a gear train, the gear train having a spur gear, an idler gear and a gear, the gear is secured to the adjustment screw and the idler gear meshing with both the gear and the spur gear and the spur gear is secured to a drive member.

15. The method as in claim 14, wherein the cursor assembly is a pivoting cursor assembly.

* * * * *